INVENTOR.
PHILIP R. MATLACK
BY Hodges
Harvey A. David
ATTYS.

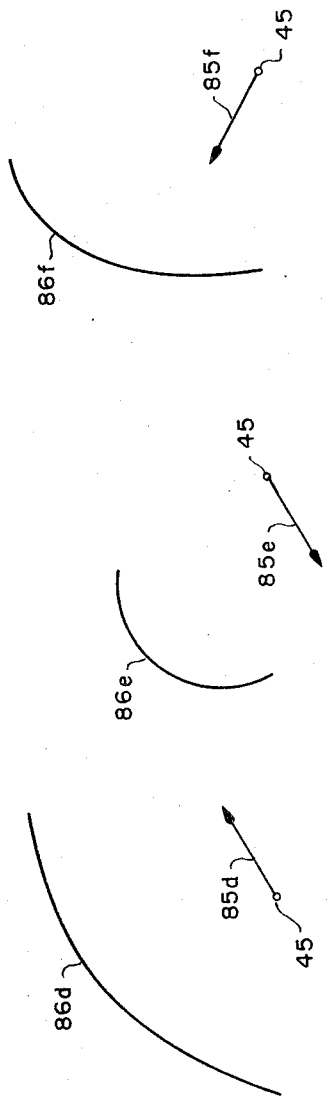

United States Patent Office 3,301,104
Patented Jan. 31, 1967

3,301,104
APPARATUS FOR TURNING CURVED SURFACES
Philip R. Matlack, 2700 N. 25th St.,
Arlington, Va. 22207
Filed Jan. 29, 1965, Ser. No. 429,179
9 Claims. (Cl. 82—12)

The invention described herein may be manufactured and used by or for the Government of the United States of America for governmental purposes without the payment of any royalties thereon or therefor.

This invention relates to improvements in turning apparatus and more particularly to apparatus for turning internal curved surfaces, for example a hemisphere or other surface of revolution at the inner end of a bore.

It is a primary object of this invention to provide apparatus which may be conveniently applied to or supplied as part of turning apparatus such as a lathe or otherwise ordinary construction, and by means of which various cuved surfaces may be accurately turned.

Another object of the invention is the provision of apparatus of the foregoing character which may be readily adjusted to turn spherical surfaces of different radius or curved surfaces having progressively changing radii.

As another object the invention aims to provide apparatus for automatically progressing from the turning of an internal cylindrical surface to the turning of a curved surface such as may define the internal end of a cylindrical bore.

Yet another object of the invention is to accomplish all of the foregoing through the provision of apparatus comprising a tool holder which is pivotally mounted to swing a cutting tool about the tool holder pivot so as to generate a curved surface in a rotating workpiece, the tool holder being mounted on a slide member which is slidably mounted on a carriage, a drive linkage connecting the tool holder and the carriage for effecting rotation of the tool holder as a result of relative movement between the carriage and the slide member, such relative movement being produced by continued movement of the carriage after arresting of movement of the slide member toward the workpiece by suitable adjustable stop means, and the slide member being angularly adjustable with respect to the direction of carriage movement so as to produce translation of the tool holder pivot during swinging movement of the tool holder.

The invention may be further said to reside in certain constructions and arrangements of parts by which the foregoing objects and advantages as well as others may be achieved, as will be understood from the following detailed description of a presently preferred embodiment of the invention when read in conjunction with the accompanying sheets of drawings forming a part of this specification, and in which:

FIG. 3 is a fragmentary plan view taken along line 3—3 of FIG. 1; and

FIGS. 4a–4f are diagrammatic illustrations of different movements produced in the tool as a result of adjustments of the apparatus.

Figure 1:
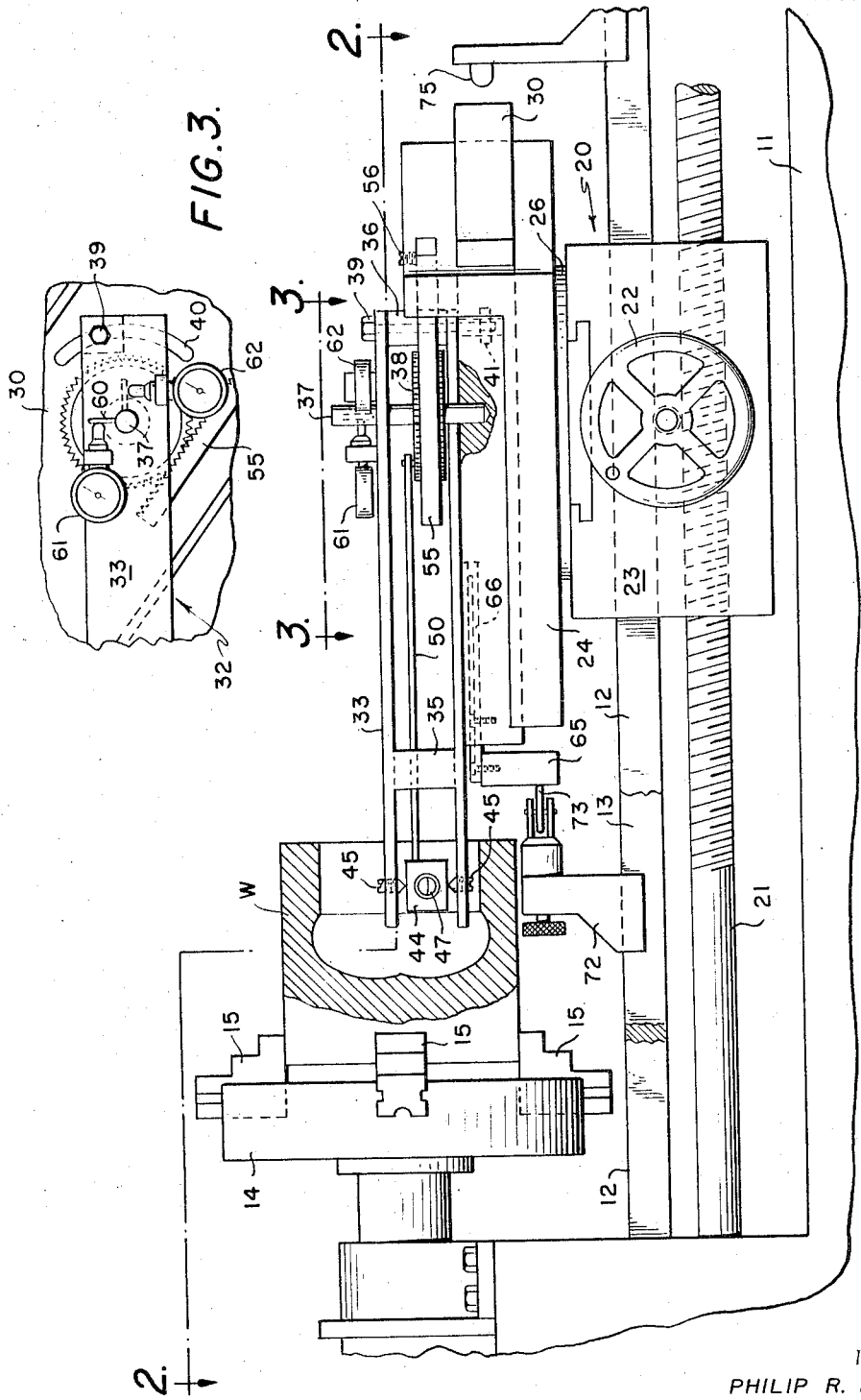
FIG. 1 is a front elevational view of turning apparatus embodying the present invention.

In the form of the invention illustrated in the drawings and described hereinafter, there is provided an apparatus 10 comprising a bed 11 including longitudinally extending ways 12 and 13. Disposed at one end of the bed 11 is workpiece supporting and rotating means comprising a chuck 14 having jaws 15 for gripping a workpiece W. The chuck 14 is rotated by any suitable drive means (not shown) well known to those skilled in the art to which the invention pertains.

A carriage, generally indicated at 20, is mounted on the ways 12, 13 for movement toward and from the workpiece W and its supporting chuck 14. In this regard, the carriage 20 may be moved along ways 12, 13 either by power means through a lead screw 21, or manually through operation of a handwheel 22.

The carriage 20 comprises a lower portion 23 actually riding the ways 12 and a laterally and angularly adjustable upper portion 24 which may be secured in selected positions with respect to the lower carriage portion. To this end, the upper carriage portion 24 is connected to the lower portion 23 by means of a cross-slide 25 which is provided with a graduated disc 26 for determining angular positions of the upper carriage portion 24 with respect to the direction of travel of the lower carriage portion along the ways 12, 13. Such arrangements are conventional in lathe carriages and need not be further described for an understanding of the invention.

Figure 2:
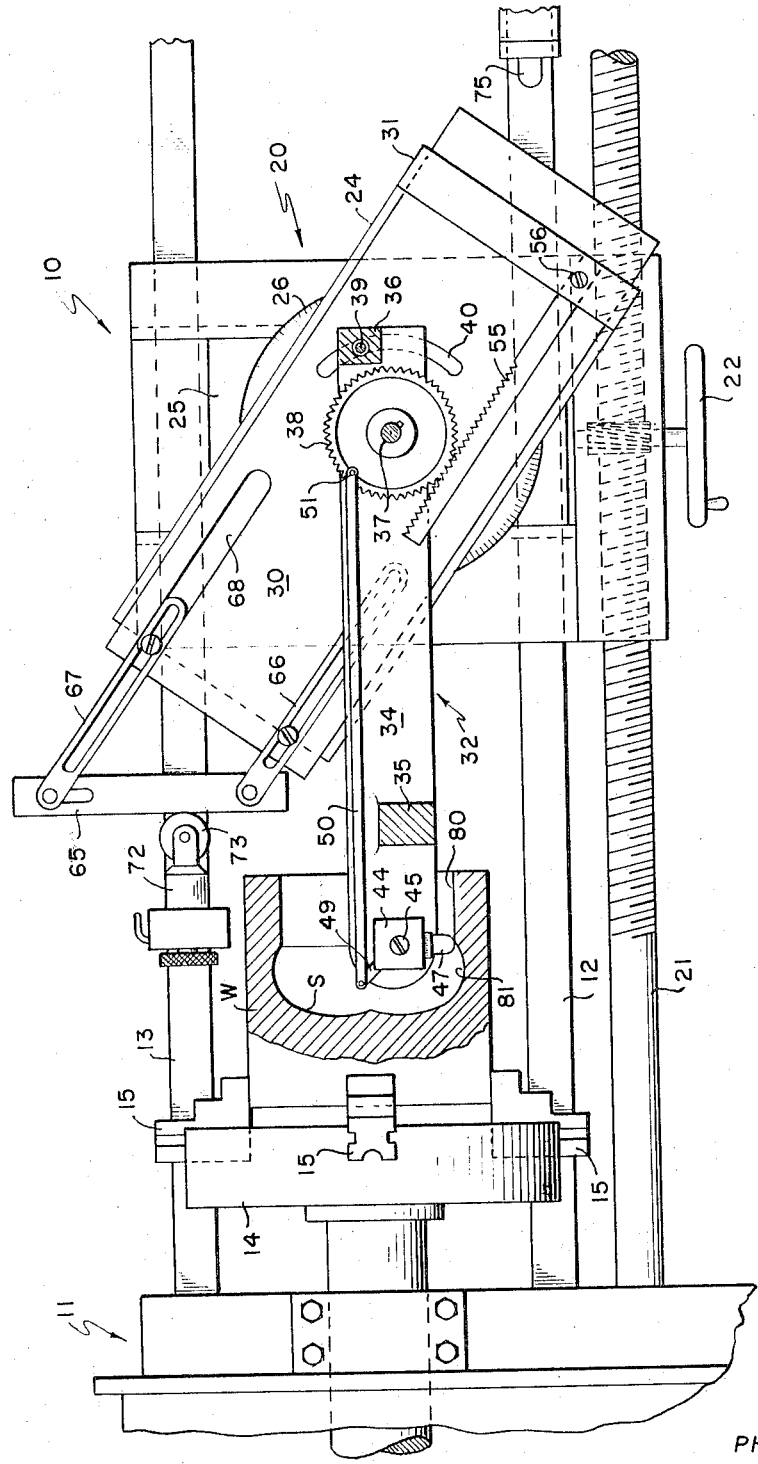
FIG. 2 is a sectional view of the apparatus of FIG. 1 taken substantially along line 2—2 thereof.

As illustrated in FIG. 2, the upper carriage portion 24 has been rotated clockwise to an angle of approximately 30 degrees from alignment with the direction of travel of the carriage 20, and has been laterally displaced toward the front of the apparatus. The purposes of these adjustments will become apparent as the description proceeds.

Reciprocably mounted on the upper carriage portion 24 is a slide member 30 which is slidingly embraced by a rectangular frame 31 forming part of the upper carriage portion. The slide member 30 carries an arm generally indicated at 32 which comprises upper and lower walls 33, 34 connected in spaced parallel relation by spacer members 35, 36 which may be formed integrally with the rest of the arm.

The arm 32 is pivoted to the slide member 30 by a through axle shaft 37 for a pinion 38 which is disposed between the upper and lower walls 33 and 34. The axle shaft 37 is conveniently in axial alignment with the pivoted connection between the upper and lower carriage portions.

A lock bolt 39 extends through spacer member 36, an arcuate slot 40 in the slide member 30, and engages a nut 41 recessed in the underside of the slide member. The bolt 39 may be loosened to permit the arm 32 to be adjustably positioned, after which the bolt 39 may be tightened to retain the adjustment. In the illustrated example, the arm 32 is positoned parallel to the axis of rotation of the workpiece. However, the arm may be positioned at an angle thereto, for example when turning the walls of a large recess having a relatively small opening.

At the terminal end of the arm 32 is pivotally mounted a tool holder 44. The tool holder 44 is preferably journalled on adjustable conical pivot screws 45, the tool holder being provided with a radially extending cutting tool 47. The tool holder 44 includes a radially extending arm 49 which is connected by a link 50 to a crank pin 51 on the pinion 38.

Cooperating with the pinion 38 is a rack 55 which is rigidly secured by a set screw 56 in a socket or opening in the frame 31 forming part of the upper carriage portion 24. It will be recognized that relative movement between the slide member 30 and the carriage 20 causes the rack 55 to produce rotating motion of the pinion 38 which motion is transmitted by the link 50 to the tool holder 44. By making the effective crank arms of the tool holder 44 and the pinion 38 parallel and of equal length, rotation of the tool holder will equal that of the pinion.

The axis 37 for the pinion 38 is preferably keyed to the pinion for rotation therewith and protrudes above the upper wall 33 of the arm 32. The protruding end of the axle 37 is fitted with a finger 60 (FIG. 3) which is adapted to swing between adjustable micrometer gauges 61 and 62 which are suitably supported on the wall 33.

The gauges 61 and 62 may be used to accurately determine the starting and stopping positions of the tool 47 in its excursion about pivot screws 45.

The slide member 30 is provided at its end nearest the chuck 14 with a transverse adjustable bar 65 which is supported at opposite ends by slotted extension elements 66, 67. The extension elements 66, 67 are slidable in recesses 68 in the surface of the slide member 30 and are adapted to be secured by screws 69 and 70 respectively. This construction permits independent adjustment of the bar 65 to various angular positions irrespective of angular adjustment of the upper carriage portion 25.

The bar 65 cooperates with an adjustable micrometer stop means 72 having a roller 73 which is engageable with the bar to halt or modify movement of the slide member 30 with respect to the workpiece and to initiate swinging movement of the tool holder 44 upon continued movement of the carriage 20 toward the workpiece.

It should be noted at this time than an angular position of the slide 30 with respect to the direction of travel of the carriage along the ways will result in transverse motion of translation in the slide member and in the pivot screws 45 beginning with the contact of the bar 65 with the stop means 72. This translational movement of the pivot screws 45, during swinging movement of the tool holder about the pivot screws, generates a curved internal surface S in the workpiece W which is a function of the rate of rotation and rate of translation. Of course, if the slide member 30 is aligned with the ways 12 and axis of workpiece rotation, the tool will swing around stationary pivot screws 45 and will generate a spherical cut in the workpiece.

When the carriage is retracted from the workpiece W, the slide member 30 is engageable with a second stop means 75 which reverses the relative movement between the slide member and the carirage so as to return the tool holder 44 to a desired starting position as indicated by gauge 61.

The stop means 72 may be adjusted to permit travel of the slide member 30 and carriage 20 together during a cylindrical turning operation to produce a cylindrical surface 80 in the workpiece which merges with the curved surface S produced by the combined rotary and translational movements of the tool holder after the bar 65 engages the stop means 72.

In the present example the upper carriage portion 25 is disposed at an angle of clockwise rotation of approximately 30° from the axis of the workpiece, while the stop bar 65 is disposed at right angles to that axis. This configuration will produce translational movement of the pivot screws 45 as represented by a vector arrow 85a in FIG. 4a. The combined translational movement of the pivot screws 45 and rotary movement of the tool holder 44 by rack and pinion drive linkage will cause the tool 47 to describe a curve 86a which will generate the desired internal surface S in the rotating workpiece.

FIG. 4b illustrates movement 85b of pivots 45 to produce a curve 86b when the upper carriage portion is disposed about 30° to the opposite side of the workpiece axis and the bar 65 is normal thereto. When the apparatus 10 is so set up it will be understood that the stop means 72 will be conveniently shifted to the way 12 for engagement by bar 65.

FIGS. 4c through 4f show other types of curves 86c–86f which will result from translational movements 85c–85f of the pivot points 45 combined with rotation of the tool 47 thereabout. These translational movements are produced by adjusting the bar 65 at angles other than normal to the workpiece axis, the upper carriage portion 25 being at an angle to one side or the other of that axis, so that movement of the slide member 30 will be modified by engagement of bar 65 with the stop means and as the lower carriage portion continues movement toward the workpiece.

In addition to adjusting the rates and direction of translational motion by adjusting the angles of the slide member 30 and the bar 65 to the axis of rotation, the rate of rotational movement of the holder 44 may be varied by substituting pinions 38 of different diameters together with appropriate racks 55.

From the foregoing detailed description of a presently preferred embodiment of the invention it will be appreciated that there has been provided a novel and versatile apparatus for turning surfaces of different characteristics of curvature. It will also be appreciated that the invention has accomplished the aforementioned objects and advantages, as well as others apparent herefrom, and that this is by reason of the novel relationship of parts providing the ability to produce simultaneous rotational and translational movements in the tool holder.

Although the invention has been described in considerable detail with reference to a specific turning apparatus embodying the invention, it will be understood that the invention is not limited thereto, but rather the invention includes all those modifications, adaptations, substitutions and uses as are reasonably embraced by the scope of the claims hereof.

What is claimed is:

1. Apparatus of the character described comprising:
a bed having longitudinal ways;
means for supporting and rotating a workpiece;
carriage means mounted for movement along said ways toward and from said workpiece;
a slide mounted on said carriage for reciprocating movement with respect thereto;
an arm extending from said slide in the direction of said workpiece;
a tool holder pivotally mounted at the terminal end of said arm;
motion transmitting means connected between said tool holder and said carriage for effecting rotation of said tool holder upon relative movement between said carriage and said slide; and
stop means mounted on said bed for limiting movement of said slide toward said workpiece upon movement of said carriage means to effect said relative movement.

2. Apparatus as defined in claim 1 wherein said motion transmitting means comprises a rack mounted on said carriage;
a pinion mounted on said slide in meshing engagement with said rack; and
a link connected between said pinion and said tool holder.

3. Apparatus as defined in claim 2 wherein said pinion is fixed to a shaft;
a finger extending from said shaft for angular movement corresponding to rotation of said tool holder; and
gauge means cooperable with said finger for indicating rotative positions of said tool holder.

4. Apparatus of the character described comprising:
a bed having longitudinal ways;
means at one end of said bed for supporting and rotating a workpiece about an axis parallel to said ways;
carriage means mounted for movement along said ways toward and from said workpiece;
a slide mounted on said carriage means for movement with respect thereto along a path at an angle to said axis;
an arm extending from said slide in the direction of said workpiece;
a tool holder pivotally mounted at the terminal end of said arm;
motion transmitting means connected between said tool holder and said carriage for rotation of said tool holder upon relative movement between said carriage and said slide;

stop means mounted on said bed for modifying movement of said slide with respect to said workpiece and effecting said relative movement whereby said tool holder is subjected to combined translational and rotary movement.

5. Apparatus as defined in claim 4 wherein said motion transmitting means comprises a rack mounted on said carriage;
   a pinion mounted on said slide in meshing engagement with said rack; and
   a link connected between said pinion and said tool holder.

6. Apparatus as defined in claim 5 wherein said pinion is fixed to a shaft;
   a finger extending from said shaft for angular movement corresponding to rotation of said tool holder; and
   gauge means cooperable with said finger for indicating rotative positions of said tool holder.

7. Apparatus of the character described comprising:
   a bed having longitudinal ways;
   means at one end of said bed for supporting and rotating a workpiece about an axis parallel to said ways;
   carriage means mounted for movement along said ways toward and from said workpiece, said carriage means comprising a lower portion riding said ways and an upper portion angularly positionable with respect to said axis;
   a slide reciprocably mounted on said upper carriage portion and positionable therewith at angles to said axis, said slide having a bar at one end and independently angularly positionable with respect to said axis;
   an arm extending from said slide in the direction of said workpiece;
   a tool holder pivotally mounted at the terminal end of said arm;
   motion transmitting means connected between said tool holder and said carriage for effecting rotation of said tool holder upon relative movement between said carriage and said slide; and
   adjustable stop means mounted on said bed and cooperable with said bar to modify movement of said slide with respect to said workpiece during movement of said carriage toward said workpiece and to effect said relative movement, whereby translational movement of said tool holder is combined with rotation thereof.

8. Apparatus as defined in claim 7 wherein said motion transmitting means comprises a rack mounted on said carriage;
   a pinion mounted on said slide in meshing engagement with said rack; and
   a link connected between said pinion and said tool holder.

9. Apparatus as defined in claim 8 wherein said pinion is fixed to a shaft;
   a finger extending from said shaft for angular movement corresponding to rotation of said tool holder; and
   gauge means cooperable with said finger for indicating rotative positions of said tool holder.

No references cited.

WILLIAM W. DYER, JR., *Primary Examiner.*

LEONIDAS VLACHOS, *Examiner.*